(12) United States Patent
Levin et al.

(10) Patent No.: US 7,528,721 B2
(45) Date of Patent: *May 5, 2009

(54) IDENTIFICATION AND LOCATION OF RF TAGGED ARTICLES

(76) Inventors: Eduard Levin, 208-80 Inverlochy Boulevard, Thornhill, Ontario (CA) L3T 4P3; Evgueni Rozoumovitch, 205 Maxwell Street, Toronto, Ontario (CA) M3H 5B6

( * ) Notice: Subject to any disclaimer, the term of this patent is extended or adjusted under 35 U.S.C. 154(b) by 278 days.

This patent is subject to a terminal disclaimer.

(21) Appl. No.: 11/502,673

(22) Filed: Aug. 14, 2006

(65) Prior Publication Data

US 2008/0042838 A1     Feb. 21, 2008

(51) Int. Cl.
*G08B 13/14* (2006.01)
(52) U.S. Cl. .................. 340/572.1; 235/375; 340/572.4; 340/572.7
(58) Field of Classification Search ... 340/572.1–572.9, 340/10.1; 235/375–385
See application file for complete search history.

(56) References Cited

U.S. PATENT DOCUMENTS

| 5,317,309 | A * | 5/1994 | Vercellotti et al. | 340/10.5 |
|---|---|---|---|---|
| 5,519,381 | A * | 5/1996 | Marsh et al. | 340/10.2 |
| 5,521,601 | A * | 5/1996 | Kandlur et al. | 342/44 |
| 7,274,909 | B2 * | 9/2007 | Perttila et al. | 455/41.2 |
| 2004/0046642 | A1 * | 3/2004 | Becker et al. | 340/10.32 |
| 2004/0061612 | A1 * | 4/2004 | Paradiso et al. | 340/572.1 |
| 2006/0255131 | A1 * | 11/2006 | Stewart | 235/383 |
| 2007/0290854 | A1 * | 12/2007 | Tuttle | 340/572.1 |

* cited by examiner

*Primary Examiner*—George A Bugg
*Assistant Examiner*—Edny Labbees
(74) *Attorney, Agent, or Firm*—David W. Wong (57) ABSTRACT

The RFID system is for automatic recognition of one or all of a plurality of objects or articles located in an interrogation zone and having RFID tags mounted thereon. The tags have transponders carrying RFID information codes are sequentially and individually scanned with interrogation signals and activated to emit the information codes signals readable with a reader. The interrogation signals are based on the reader antennas and the configurations and locations of the tags. Signals returned from the transponders of the tags are processed to determine their electronic product code and location. The operation is repeated until the recognition and location of all tags in the entire interrogation zone are completed.

9 Claims, 7 Drawing Sheets

— S-charging phase
═ A-charging phase
▭ Reading phase
▤ Discharging phase

IDENTIFICATION AND LOCATION OF RF TAGGED ARTICLES

BACKGROUND OF INVENTION

1. Field of the Invention

This invention relates to system of maintaining the inventory of articles or objects provided with radio frequency (RF) transducers such as tags or transponders containing electronic codes for recognition and identification of the articles. Such devices are commonly known as radio frequency identification devices (RFID). More specifically, this invention relates to methods of employing radio frequency for spatial resolution of tags, RFID tags and tags activation devices. A RFID consists of a reader-interrogator and a plurality of transponders; and the latter are affixed on the objects or articles which are subject to inventory and may be located in a storage such as a warehouse.

2. Background Art

RFID methods and systems provide the recognition of objects with identification tags affixed thereon. The process of tag recognition must be accomplished at high speed and with minimum error. In the process, it is necessary to determine the Electronic Product Code (EPC) that describes the article to which the tag is attached, and the tag location or direction relative to a reader. Some of the interrogators are provided for primarily reading the tag codes while others are only for searching for the directions of the tags. An interrogator transmits a tag activation signal for all the tags in a predetermined interrogation zone simultaneously. It adjusts the activation signal which has been sent in advance to the tags with known ID or without ID codes depending on the tag design. If the tag ID is known in advance, it will be activated accordingly such that the interrogator can read its tag electronic code with high level of accuracy because there are no other response signals from other tags. When a small number of tags, for example, one to five tags, without ID codes are activated, because of the differences in electronic circuit parameters, the tags are activated in an insignificant time lag. Furthermore, the interrogator may activate the tags repeatedly so as to increase the probability of accurate recognition of the codes. However, when a large number of tags are to be read by the reader, the response tag signals reach the reader practically simultaneously which may result in failure to recognize the objects with adequate accuracy even in the case of tag signal processing with some of the anti-collision protocols. Miscellaneous tri-angular methods and reader multi-antenna design have been employed for resolving the above problem.

The RFID Handbook by Klaus Finkenzeller, Carl Hansen Verlag, Munich/FRG, 1999 outlines four methods of solving the problem of space, frequency, code and time discriminations in RFID.

U.S. Pat. Nos. 6,600,443 and 6,476,756 both to J. A. Landt, and U.S. Pat. No. 6,069,564 to R. Hatano et al illustrate methods and systems tag reading and the determination of its direction. The Landt patents illustrate a method of tag signal structure analysis while the Hantano et al patent proposes a multi-directional RFID antenna for this purpose.

Canadian Patent No.2,447,975 to P. M. Eisenberg et al, and No.2,399,092 and No.2,450,189 both to P. A. Sevcik et al describe aspects of the collection and use of data obtained by RFID tag interrogation, in particular, by comparing information obtained through interrogation of tags with the data recorded during repeated interrogation.

U.S. Pat. No. 6,317,028 to c. Valinlis; U.S. Pat. No. 5,822,714 to R. T. Cato; U.S. Pat. No. 6,034,603 to W. E. Steeves; and Canadian Patent No.2,447,975 to P. M. Eisenberg et al show RFID systems of tag recogniation for the case of a plurality of radio frequency identification tags. To effectively recognize tags, a number of other technical solutions assume a tag data base as previously known and perform its current status control through comparison of the read current values with the data of a base as shown in U.S. Pat. No. 5,822,714 to R. T. Cato.

U.S. Pat. No. 6,034,603 to W. E. Steeves also shows a method and system of tag construction with improved tag interference avoidance in which a tag includes both a receiver module and a processor, while the generation of a signal is decided as a result of analysis of radio frequency activity.

U.S. Pat. No. 7,030,761 to R Bridgelall et al shows a multi-resolution object location system and method for locating objects which employs a long range object locator together with a more precise RFID locator. The long range locator is used to first determine the general location of the object, and then the RFID locator further determines a more accurate location of the object.

U.S. Pat. No. 7,038,573 to G. Bann shows systems and methods for tracking the location of items within a controlled area having a plurality of RFID tags. Vehicles configured to transport the items being tracked are provided with two RFID interrogators to obtain the location of the vehicle.

U.S. Pat. No. 7,042,358 to S. E. Moore shows a method and apparatus for tracking items automatically in which a passive tag is used with remote sensing antennas placed at each remote location and a host computer communicates with the interrogators to determine item locations to an exacting measure.

U.S. Pat. No. 7,046,145 to W. Maloney shows RFID an object tracking and control system having a storage receptacle with a tray provided with an array of slots for receiving ID tags bearing touch memory devices. A computer-based controller detects the absence or presence and identity of ID tags disposed in the slots.

None of the above patents teach any RFID method and system possessing features which can perform recognition and locating functions of a plurality of objects as well as reading the codes and locating tags of both single decoding or working simultaneously with large numbers of articles under conditions of locating the inventory objects on a plane or in a random volume with minimization of errors caused by the reflection of signals form surrounding surfaces. Furthermore, the prior art patents fail to suggest, any RFID method of tag recognition and location in an interrogator close zone—Fresnel Zone when the distance between the tag and the reader antenna is relatively small and comparable with the antenna aperture.

SUMMARY OF THE INVENTION

The principal object of the present invention is to provide recognition systems with radio frequency identification devices (RFID) and, more specifically, to provide radio frequency methods of three-dimensional tag selection, creation of tag activation devices and their algorithms as well as the tag design.

The read range of the reader is determined according to dimensions of an interrogation zone and a search starting point. The possible location of the tags is selected in the form of a small spatial domain namely a local interrogation zone. The interrogator starts the transmission fo the tag activation signals through at least two spatially separated antennas. The time of each signal transmission and delay (or delays in case of more than two antennas are employed ) between the signals is calculated in accordance with the tags assumed location which is entered into the interrogator memory. This transmits a time-spatial information forming activating signals would create a maximum of electromagnetic field intensity at the position at which a tag is supposed to be activated. The signals from different antennas should enter the local interrogation zone in phase. The signals are received by each one of the tags, and only the tag for which the interrogator signals are calculated and transmitted according to the specific formulas, will be activated. Since it is possible that tags situated close to the antenna but not located within a local interrogation zone may also receive activating signal of an intensity large enough to become activated, the duration of the activation signal and the number and location of the transmitting antennas are made variable.

The activated tag emits its own identification signal which carries the information about the individual tag code. This identification signal is received by the reader and a tag code is selected and entered into the reader memory according to the preliminary calculated tag location. Following the assumed location of a tag has been selected, calculated, and entered into the reader memory, the next signal sequence transmission will be calculated and the signals are transmitted through the reader antennas, etc. The entire sequence is repeated for scanning the entire interrogation zone.

The invention possesses numerous benefits and advantages over known RFID systems. In particular, the invention permits the reduction of time of search and recognition of tags when there are a large number of tags to be recognized within a particular interrogation zone. It can locate each one of a plurality of objects or articles and increases the probability of reading the codes without error. Noise immunity is achieved due to the elimination of false responses when receiving signals are reflected from random surfaces such as the warehouse walls, shelves, adjacent articles, container surfaces, etc. One embodiment of the invention can be used with existing tags Generation 1, 2 without any modifications of the existing transponders, including SAW tags. It may be used in a single channel, or two-channel, or multi-channel systems. The universal character of the system allows it to be used selectively either as a mobile or a stationary device, as well as a two dimensional or three dimensional space version.

The present invention resolves the complex problem in object location, tracking and recognition all in cases of a single decoding, as well as with a large number of articles simultaneously located in an inventory object location in diverse conditions; and it is applicable in a wide variety of fields in manufacturing, shipping or storage.

The RFID method and system of the present invention are based on the implementation of a tag activator for creating specific signals which perform tag interrogation zone multi-step scanning, selected transponder activation, and processing the transponder signal by the reader for:

Determination of the total interrogation zone coordinates and writing them into the reader memory;

Determination of local interrogation zone start point coordinates and writing them into the reader memory;

Determination of the number of group of interrogator antennas and the number and position for each antenna in a group;

Calculation of the number of transmission of activation signals;

Calculation of activation signal parameters for each interrogator antenna in a group for each group of antennas for the assumed tag location, i.e. local interrogation zone;

Creating signals for tag activation at the tag activator coder;

Transmitting of signals by the first group of interrogator antennas;

Transmitting of signals by the second group of interrogator antennas;

The procedure of transmitting of signals repeats until the number of transmission coincides with the calculated in advance number of transmitting or signal form activated tag received by the reader;

The selected tag signal has been received by a reader, then the tag electronic code is retrieved from a signal and memorized by the reader, and the reader memory keeps the tag coordinates which indicate the location of the object with a tag;

If in the course of time determined by a search area range and no response signal has been received, then the following step of search is performed by shifting the local interrogation zone on the coordinate off one step, which is determined by the tag activator resolution;

The procedure of activation signals creation, transmitting and processing, tag signal receiving is repeated until the total interrogation zone is completely examined;

Tag electronic codes, their location and other tag information are indicated on the reader data base and monitor.

DETAILED DESCRIPTION OF THE PREFERRED EMBODIMENTS

Figure 1:
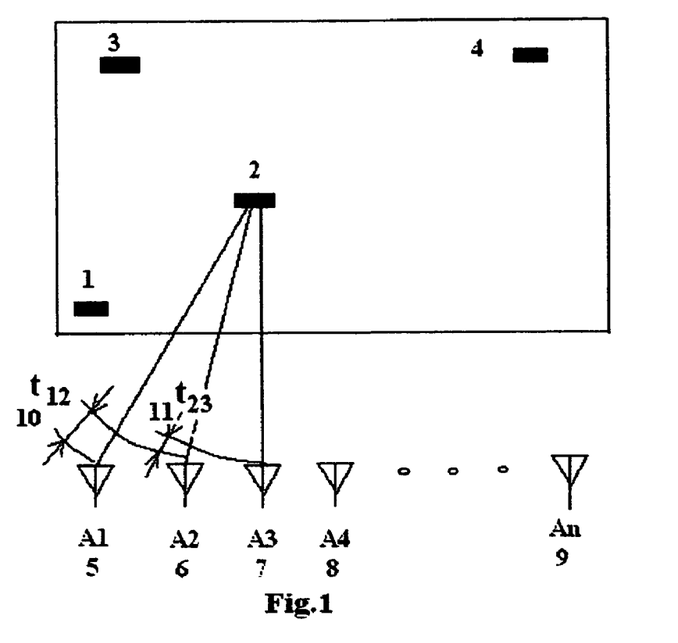
FIG. 1 is a schematic layout of the location of the tags and antennas transmitting the first group of activating signals relating to the concept of tag activation according to the present invention.
Figure 2:
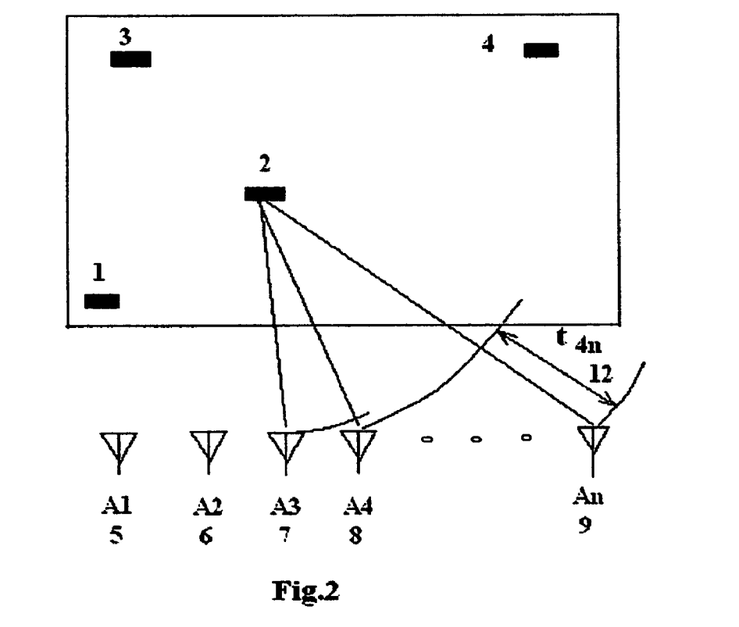
FIG. 2 is a schematic layout of the location of tags and antennas transmitting the second group of activating signals relating to the concept of tag activation according to the present invention.

With reference the drawings, the procedure of the activation of tags located within an interrogation zone is shown on FIGS. 1 and 2. A tag can be located randomly in points, for example, from Point 1 to Point 4 within a local interrogation zone representing tags 1 to 4 locating at these points on a flat surface in a two dimensional interrogation zone. If a tag is located at Point 2 and is transmitting a response signal, the signal is received by the antennas A1 and A2 with time delays $t_{12}$ and $t_{23}$ as shown by positions 10 and 11 in FIG. 1. Similarly, the time delays received by a plurality of N number of antennas An will be $t_{4n}$ as shown by position 12 in FIG. 2. Whereas in a reversed situation, namely, if signals being transmitted by antennas A1 and A2 in which the signal from A1 is delayed by the time $t_{12}$ will reach tag 2 simultaneously and in phase with an amplitude of the sum of two signals increased two times in comparison with separate signal. In the event when signals are transmitted by three antennas with the proper delays to provide in-phase signals arriving at the tag location, the amplitude gain at the selected tag is equal to 3. Thus, for any location in an interrogation zone for N number of antennas sent properly time delayed signals at a selected tag, the amplitude gain is equal to N. At the same time, for any other tag location in the interrogation zone, because of the time delayed signals are not in phase, the amplitude gain would be less than N. Actually, any interrogation zone consists of a plurality of local zones with a main maximum corresponding in phase signal summing from all antennas and auxiliary maximum of corresponding summing of signal from some of the antennas would result in a minimum of electromagnetic field intensity because of signal summing with opposite phases, and it would cause a false activation for some tags not supposed to be activated. For this reason, tag activation must be created in a two step procedure using time-spatial forming of activation signal to initialize selected tags in two or three dimensional spaces. Spatial forming is the process of using a group of different spatially distributed antennas for each sequential step in a process of each tag activation with the proper time delays for in phase signal summing at a local interrogation zone. Time forming is the process of using activation signal in the form of pulses having proper duration, transmitted outward by each group of antennas for each sequential step in a process of each tag activation.

Figure 3:
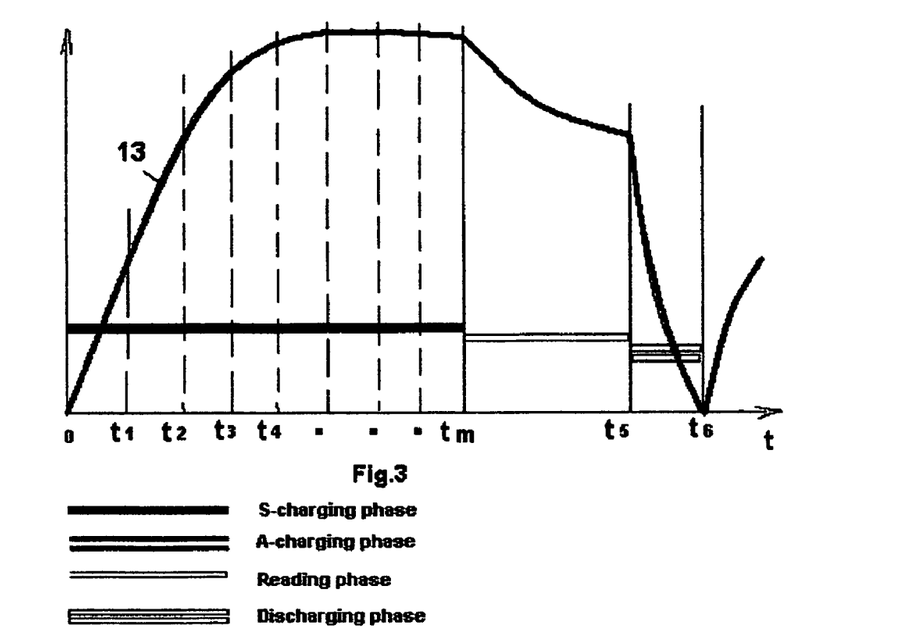
FIG. 3 is a graph showing the voltage path of the charging capacitor of a tag relating to the concept of selected tag activation according to the present invention.

In order to realize the time forming of activation signals, the induced voltage generated in the tag by the effect of the alternating electromagnetic field from the interrogator is rectified for charging the tag capacitor to supply the power to the tag. The voltage path 13 of a tag capacitor is shown in FIG. 3 in which S-charging phase is the phase of the voltage for charging selected tags;

Reading phase is the phase of transmitting signal contents electronic code by the tag to the reader; and Discharging phase is the phase to set up voltage at the tag battery at zero.

Figure 4:
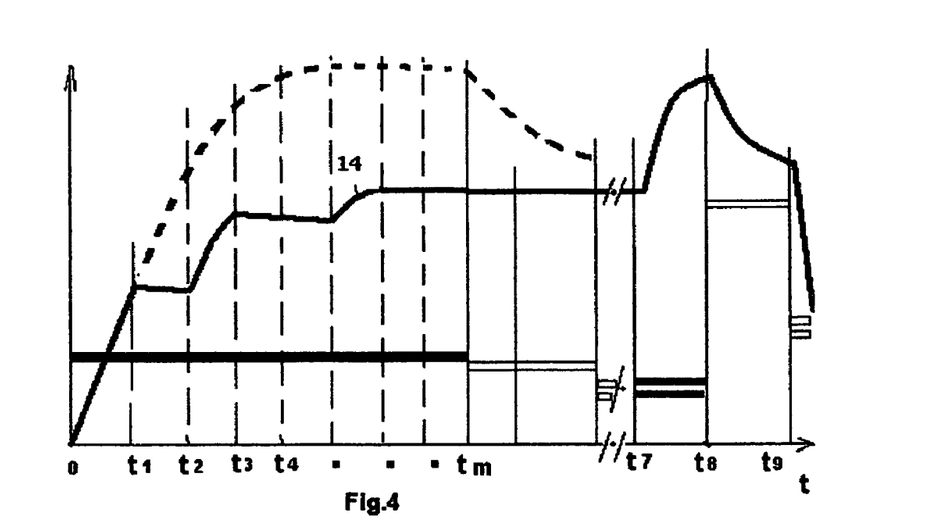
FIG. 4 is a graph showing the voltage path of the charging capacitor of a tag relating to the concept of all tags in the interrogation zone activation according to the present invention.

The activation signal from the interrogator charges the tag batteries for any tag located inside an interrogation zone especially for interrogator with omni directional antennas. Spatial forming of activating signal creates a maximum electromagnetic field intensity at the local interrogation zone. However, in some cases, the electromagnetic field magnitude is sufficiently large to charge another tag located close to the interrogator tag, for example, the tag 1 in FIG. 1, especially when the tag to be activated is situated far enough form the interrogator tag 4. To avoid this situation, the time of S-charging is divided by intervals 0-t1, t1-t2, ..., $t_m$-1-$t_m$ as shown in FIG. 4, and the interrogator antennas are united in groups A1-A2-A3, A3-A4-An etc., as shown in FIG. 2. The number of groups is equal to the number of time intervals.

The position of each group and time of activating signal transmitting is chosen to provide proportional distribution of electromagnetic field in the interrogation zone for non-phased signals. In this situation, even for the tag which is not to be activated and nevertheless its tag capacitor is charged due to a strong electromagnetic field during the time interval t0-t1; however, at the next time interval t1-t2 it would receive much less induced energy because the antenna group positions and the antennas in the group have changed.

As shown in FIG. 4, the voltage path 14 of the capacitor in a selected tag is at the time $t_m$ of the end of the S-charging phase, and the tag is ready for its electronic code transmission, namely entering into the reading phase, meanwhile the voltage 14 at the capacitor of the tag which is not intended to be activated is lower than the sufficient level for it to transmit the information signal.

Figure 5:
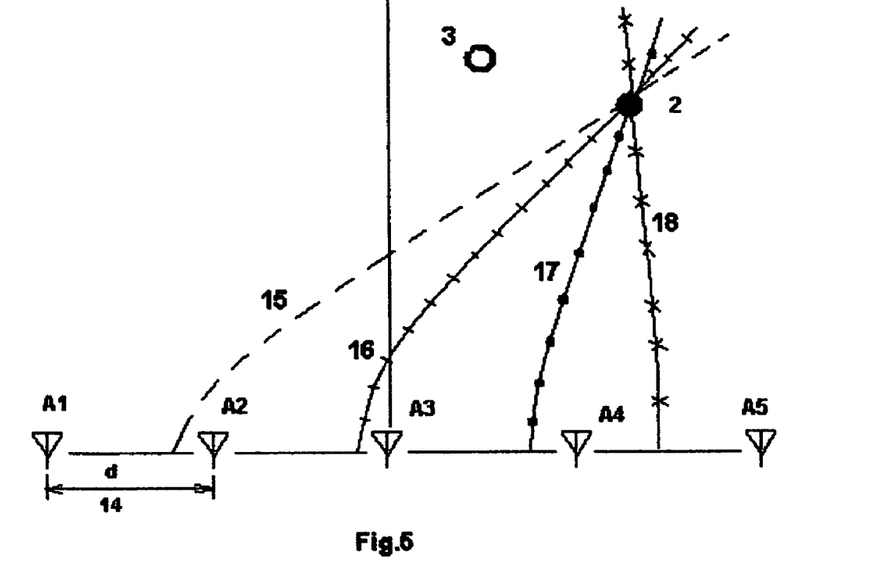
FIG. 5 is a schematic layout of the interrogator antennas transmitting the activating signals relating to the concept of selected tag activation according to the present invention.

As shown in FIG. 5, the fixed time delay between signals emitted outward by the interrogator antennas corresponds, for example, to any point on the hyperbolic curve 15 for antennas A1 and A2. Thus, only one local interrogation zone can be created by the chosen proper time delays for any interrogator antennas because there is only one point of intersection of the hyperbolic curves 15, 16, 17 and 18 for the antennas A1-A2, A2-A3, A3-A4, and A4-A5.

Figure 6:
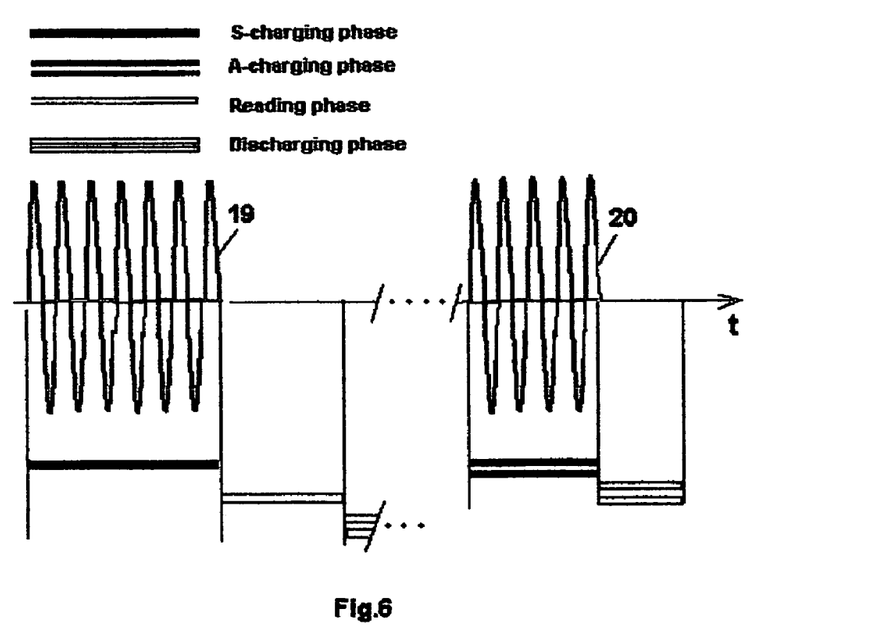
FIG. 6 is a graph showing the activation signal relating to the concept of two phase charging according to the present invention.

When the S-charging phase, Reading phase and Discharging phase have terminated for a selected tag, some other tags may also still remain charged; however, their level of their induced voltage would be sufficient to activate the transmission of their signals to a reader yet it may cause unselected tag initiation while the next step of the selected tag activation is in progress. To avoid this undesirable situation, all tags in the interrogation zone are being activated by the signal 20 as shown in FIG. 6 during the A-charging phase i.e. all tags are being charged, followed by the discharging phase for the selected tag after its information signal has been received by the reader and the activation signal 19 for the selected has already advanced to the A-charging phase.

Figure 7:
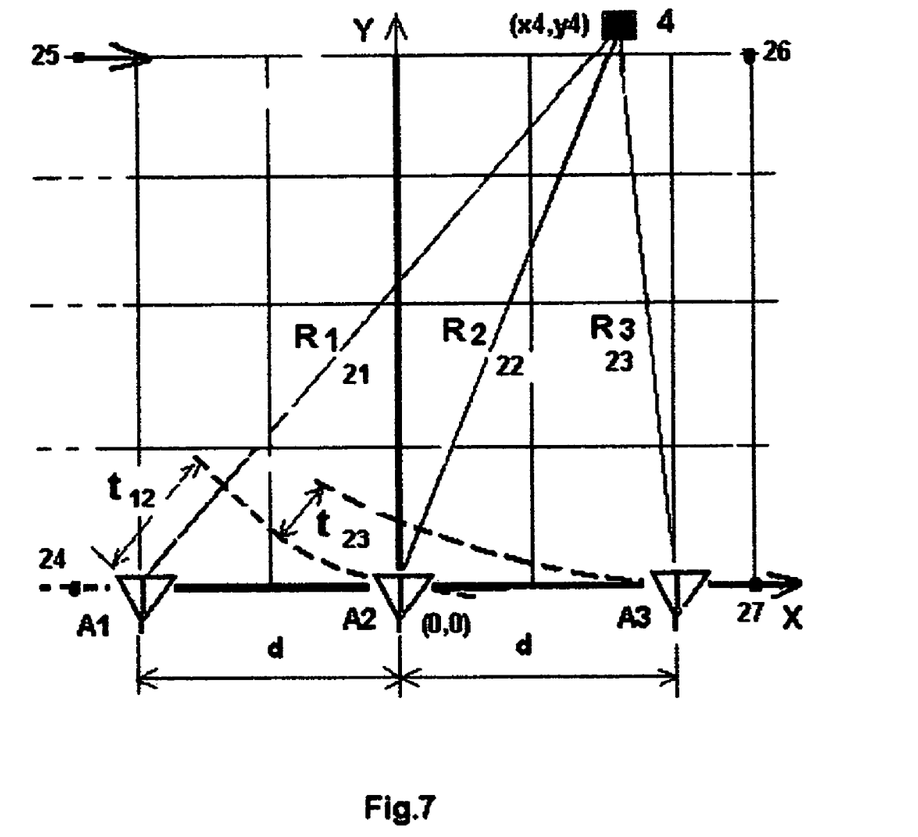
FIG. 7 is a schematic layout of the reader interrogation zone in the Cartesian coordinates in one embodiment according to the present invention.

As shown in FIG. 7, the reader interrogation zone in shown in the Cartesian coordinates X, Y, and it explains the calculation of time delays between signals for the activation of selected tags. To facilitate estimations, antennas A1 and A3 are placed symmetrically relative to the center of the coordinates, at which an antenna A2 is placed. In the general case, antennas can be placed on the surface within the X and Y coordinates randomly. The search area, namely the interrogation zone has, for example, the shape of a rectangle defined by four points, points 24, 25, 26, and 27. d is the distance between the antennas; $t_{12}$ and $t_{23}$ are time delays between signals emitted by antennas A1-A2; A2-A3 accordingly to provide in phase activation signal summing at point 4; R1, R2 and R3 are distances between antennas and the tag to be activated at the coordinates $(X_4, Y_4)$.

Scanning of the interrogation zone is performed step-by-step starting from point 25 with the step size on the X axis, for example, determined by the range definition (i.e. the direction shown by the pointer ). To calculate the parameters of the activating signals and the delay times relative to each other, the following equations are used:

$$R1=\sqrt{(X_4+d)^2+(Y_4)^2},$$

$$R2=\sqrt{(X_4)^2+(Y_4)^2}, \quad (1)$$

$$R3=\sqrt{(X_4-d)^2+(Y_4)^2},$$

$$t_{12}=(R1-R2)/C;\ t_{23}=(R2-R3)/C, \quad (2)$$

where C is a signal propagation velocity in the given environment.

To activate a tag in the three dimensional coordinates, the fourth antenna should be place outside of the coordinate plate X, Y.

Figure 8:
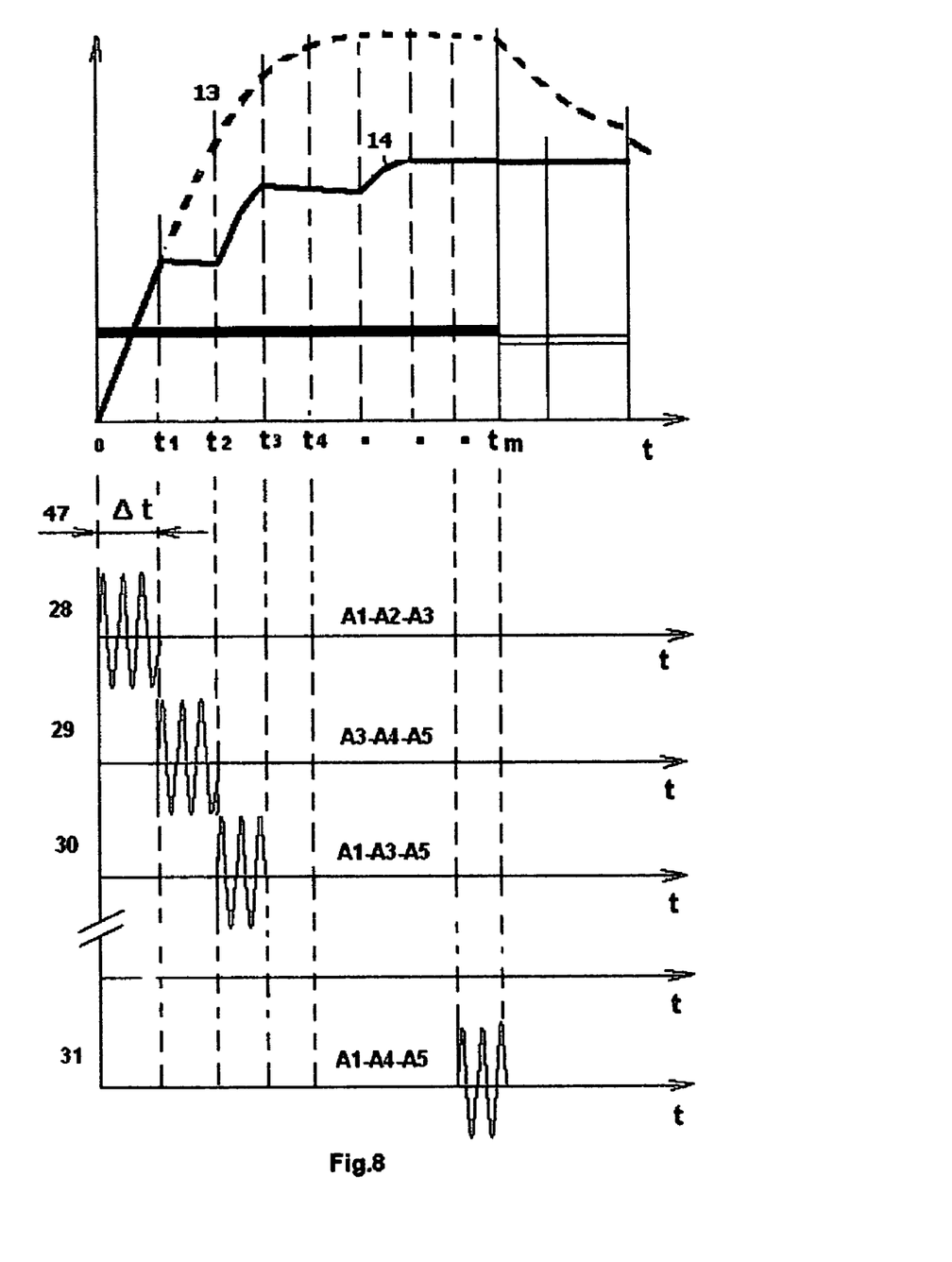
FIG. 8 is a graph showing the voltage path of the charging capacitor of a tag and signals from groups of antennas at the local interrogation zone according to the present invention.

FIG. 8 shows the sequence of activating signals from the interrogator antennas at the local interrogation zone, where the activating signals 28, 29, 30 and 31 represent an amount of separate antenna signals as the group signals of antennas A1-A2-A3, A3-A4-A5, A1-A3-A5, and A1-A4-A5 accordingly in the form of pulses with RF carrier. Each activating signal 28 to 31 has the same amplitude and limited duration equal to time interval at designated by the reference numeral 47 and displaced for same time Δt.

Figure 9:
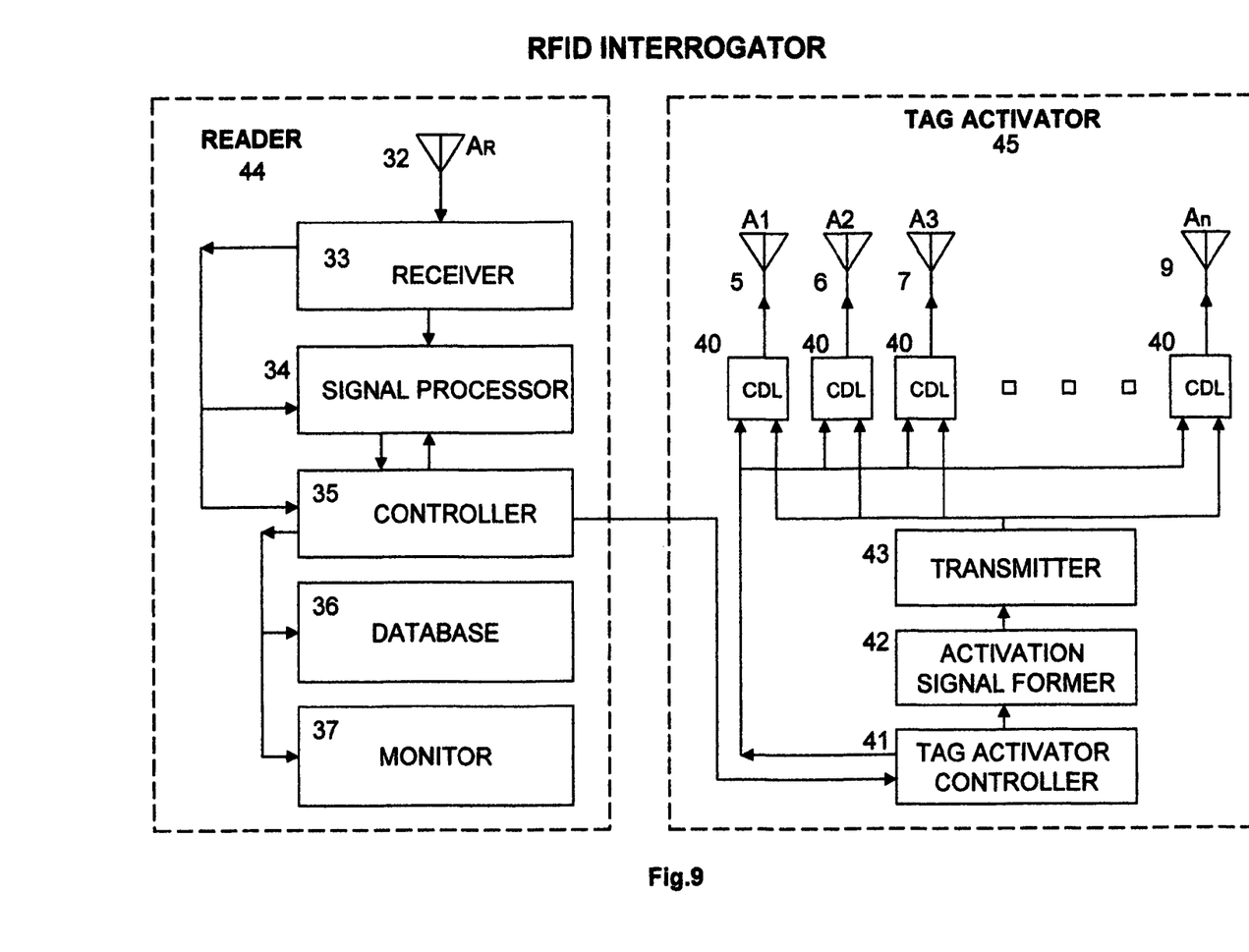
FIG. 9 is a schematic block diagram of the two-antennas RFID interrogator with tag activator according to the present invention.

A block diagram of an embodiment of the RFID interrogator according to the present invention is shown in FIG. 9. The interrogator includes a RFID reader 44 and a tag activator 45 which is operable for activating the transponder of the tag. The reader 44 is operable to receive the information signal from the tag through its antenna 32. The information is received by a receiver 33 and is recorded and analyzed by a signal processor 34. A controller 35 in combination with the signal processor 34 controls the transmission and reception of the information which is recorded and stored in a data base 36 supervised by a monitor 37 for displaying the digital, text and graphic information about the transponder and the code and the location of the tag. The tag activator 45 has a plurality of antennas A1, A2, A3 through An operable for emitting the activation signals to the tags. A tag activator controller 41 calculates the activating signal parameters for the creation of the signals by an activation signal former 42. The activation signal former 42 creates the activating signals with the proper parameters namely, frequency, amplitude, and duration for transmission through a transmitter 43 and compensated delay lines 40 which provide the proper delays for each signal in the antenna outputs. The tag activator controller 41 also controls the group of antennas in accordance with a rule of the tag located in the interrogation zone. The tag activator antennas A1 through An may be operable with a controlled directivity pattern so as to avoid false activation of the tag and to ensure noise immunity.

Figure 10:
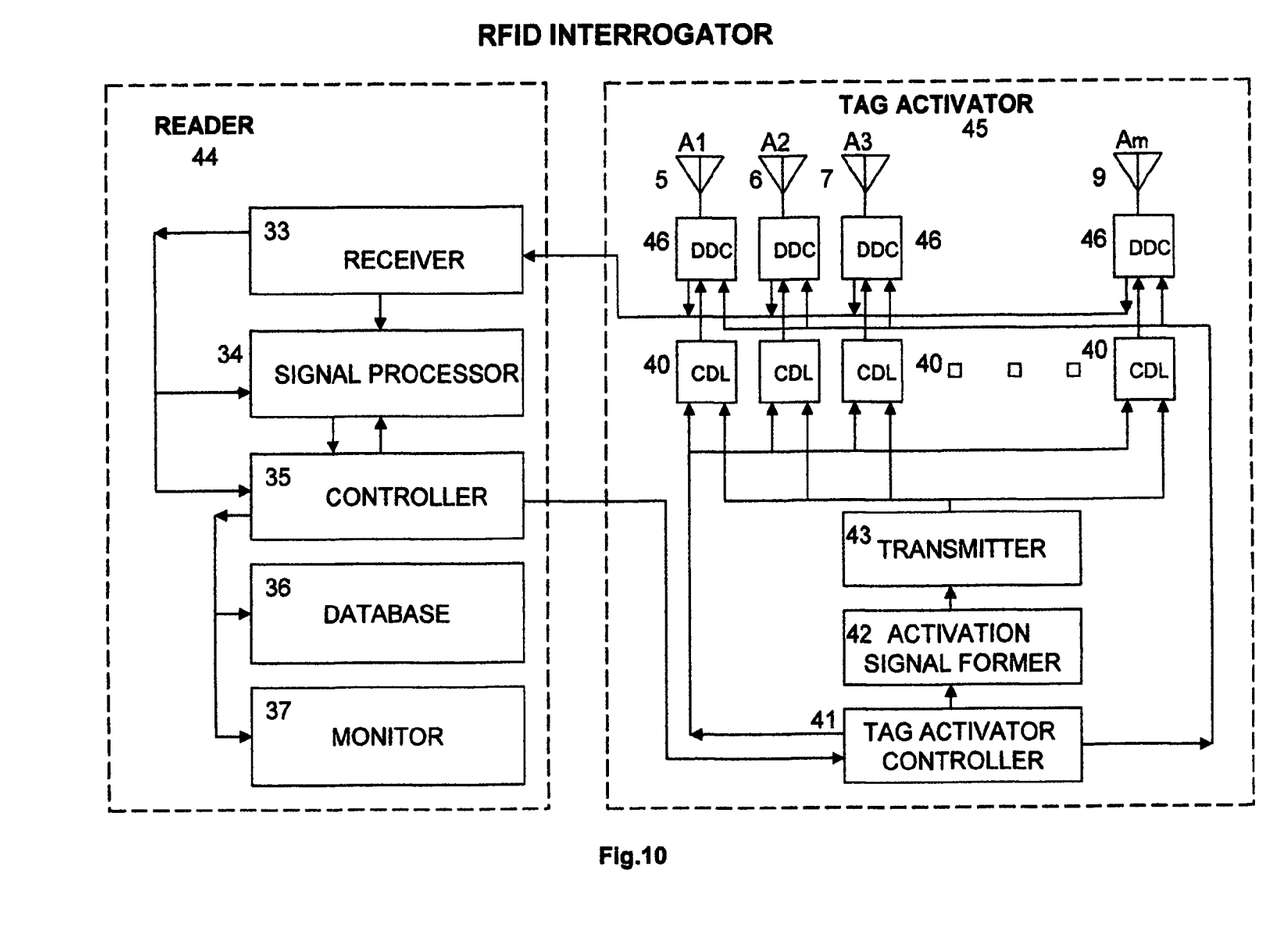
FIG. 10 is a schematic block diagram of one array antenna RFID interrogator with tag activator according to the present invention.

A second embodiment of the system of the present invention is shown in FIG. 10 which utilizes the same antenna for transmitting the activating signals to the tag as well as receiving the tag information from the latter. A dual directional coupler 46 is provided between each one of the compensated delay lines 40 and its associated antennas A1 through An. The dual directional couplers 46 operate to transmit activation signals from the tag activator 45 outward to receive the tag signals as well as to provide power to the tag transmitter 43. The dual directional couplers 46 also uncouple the transmitter 43 and receiver 33 and the compensated delay lines 40 such that the antennas A1 through An may alternately broadcast the activation signals to the tag and to receive through the receiver 33 the information data signals from the tag for storage in the data base 36.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in the light of the foregoing disclosure.

What we claim is:

1. A method of identification and location of articles provided with RFID tags located in a plurality of interrogation zones with a reader, comprising:

selecting location and coordinates of a first interrogation zone of said plurality of interrogation zones by said reader;

selecting dimensions of said first interrogation zone;

dividing said first interrogation zone into a plurality of tag interrogation zones:

transmitting tag activation signals from a plurality of transmission antennas from a selected groups of said antennas and a number of antennas in each group of said groups of said antennas to tags located in a selected tag interrogation zone;

selecting a sequence of continuing activation of said tags in said selected tag interrogation zones;

selecting a start point of scanning of said selected tag interrogation zone by said reader;

calculating signal parameters for activation of said tags for each tag interrogation zone in said tag interrogation zones by each group of antennas of said groups of antennas depending on location of said selected tan interrogation zone, activation signal power and width of said tag activation signals required to activate said tans in each one of said plurality of tag interrogation zones;

calculating time required for scanning said each one of said tag interrogation zones by said reader;

creating signals for activating selected RFID tags in accordance with calculated signal parameters for said tag interrogation zone and each one of said antennas;

transmitting sequence of activation signals by transmitting separate signal by each one of said antennas and said each group of antennas for activating said selected RFID tags in said tag interrogation zone;

calculating time lapse between beginning of signal transmission for activating said selected RFID tags from a first group of said antennas and a selected present time coinciding with an end of signal transmission from a last antenna of said group of antennas assigned for activation of said selected REID tars;

comparing said time lapse with time of scanning in said tag interrogation zone; shifting to another selected tau interrogation zone location when said time lapse is more tan said time of scanning of said tag interrogation zone;

receiving said activation signals for said selected RFID tags in said tag interrogation zone;

processing said activation signals for activating said selected RFID tags in said tag interrogation zone and making a selected tag to be activated;

transmitting a signal information from a transponder of an activated tag, receiving said signal information including tag information by said reader;

processing said signal information by said reader and reading said tag information;

creating a tag data consisting of tag coordinates, an electronic code, description of product whereon said tag is provided, and tag information data;

entering said tag information data in a RFID reader memory;

repeating above steps until scanning of each said tag interrogation zone has been completely accomplished;

organizing, storing and monitoring tag data including coordinates, electronic codes, description of articles bearing said tags, graphic view of said articles, security and service information data.

2. A method according to claim 1 wherein a number of operations of said tag interrogation zone is predetermined, and said scanning of said tag interrogation zone is repeated in accordance with said predetermined number of scanning operation.

3. A method according to claim 2 wherein said scanning of said tag interrogation zone is repeated by decreasing amplitude of said activation signals for a number of times according to a value optimizing probability of tag selection and detection, identification of electronic code and determination of tag location, until tag information signal is received by said reader.

4. A method according to claim 1 wherein said signals for activating said selected RFID tags are pulse train signals with RF carrier having amplitude shift keying and a number pulses predetermined according to parameters of said tag, said reader and said interrogation zone, and each pulse in said pulses being created as in phase summing of signals at said tag zone from signals at output of each antenna in each group of antennas.

5. An apparatus for identification and location of a plurality of RFID tags with a reader, comprising:

a plurality of antennas;

signaling means for defining activation signals operative for activating selected RFID tags, said signal means including selection means operative for selecting location and coordinates of an interrogation zone and establishing a start point of scanning of said interrogation zone by said reader, first calculating means operative for calculating parameters of activation signals for actuating said selected RFID tags for each of said interrogation zone, second calculating means being operative for determining length of dine of said scanning of said interrogation zone by said reader, said first calculating means being operative for activating said selected RFID tags in said interrogation zone and to determine activation of a present tag being interrogated, said second calculating means being operative for processing and reading information signals in response signals for reading tag information for said reader, data generation means operative in response to said response signals for creating tag data including tag coordinates, electronic code of said tags, and description and related information of product bearing said tags, recording means operative for entering said tag data into memory of said reader, monitoring means operative for organizing, storing and monitoring said tag data, and power supply means operative for providing said selected RFID tag with power supply, comparison means operative for comparing time lapse from a beginning of sending said activation signals to a predetermined present time with time of said scanning, and being operative for shifting interrogation zone location to another tag zone when said time lapse is more than time of scanning of said tag interrogation zone.

repetition means operative for repeating above steps until scanning of the entirety of said interrogation zone by said reader.

6. An apparatus according to claim 5 including means with controlled directivity pattern for transmitting signals for activating said selected RFID tag.

7. An apparatus according to claim 5 including means with controlled directivity pattern for receiving said information signals by said reader.

8. An apparatus according to claim 5 including means for scanning said interrogation zone for a predetermined number of times with said activation signals.

9. An apparatus according to claim 5 including means operative for calculating dimensions of said interrogation zone, and means operative for controlling scanning of said interrogation zone within said dimensions.

* * * * *